(12) United States Patent
Aurich

(10) Patent No.: US 10,820,583 B2
(45) Date of Patent: Nov. 3, 2020

(54) FISHING LINE THREADING AID FOR THREADING A FISHING LINE INTO THE ROD RINGS OF A FISHING ROD

(71) Applicant: Mario Aurich, Guxhagen (DE)

(72) Inventor: Mario Aurich, Guxhagen (DE)

( * ) Notice: Subject to any disclaimer, the term of this patent is extended or adjusted under 35 U.S.C. 154(b) by 372 days.

(21) Appl. No.: 15/742,958

(22) PCT Filed: Jul. 8, 2016

(86) PCT No.: PCT/DE2016/200312
§ 371 (c)(1),
(2) Date: Jan. 9, 2018

(87) PCT Pub. No.: WO2017/008802
PCT Pub. Date: Jan. 19, 2017

(65) Prior Publication Data
US 2018/0368379 A1   Dec. 27, 2018

(30) Foreign Application Priority Data

Jul. 15, 2015   (DE) .................. 10 2015 008 961

(51) Int. Cl.
*A01K 97/00* (2006.01)
*A01K 87/04* (2006.01)

(52) U.S. Cl.
CPC ............. *A01K 97/00* (2013.01); *A01K 87/04* (2013.01)

(58) Field of Classification Search
CPC ........ A01K 97/00; A01K 87/04; D04B 33/00; D04B 3/00
See application file for complete search history.

(56) References Cited

U.S. PATENT DOCUMENTS

| | | | | |
|---|---|---|---|---|
| 947,485 A * | 1/1910 | French | .................. | D05B 85/14 112/223 |
| 1,235,587 A * | 8/1917 | Moffatt | .................. | D05B 85/00 112/222 |
| 3,469,548 A * | 9/1969 | Zocher | .................. | D05B 85/00 112/222 |
| 3,965,605 A * | 6/1976 | Allen | .................... | A01K 91/04 289/17 |

(Continued)

FOREIGN PATENT DOCUMENTS

DE   19902199 A1   7/1999
EP   0174754 A2   3/1986

(Continued)

OTHER PUBLICATIONS

English language translation of International Preliminary Report on Patentability issued in International (PCT) Patent Application No. DE/2016/200312 (dated Jan. 16, 2018).

(Continued)

*Primary Examiner* — Marc Burgess
(74) *Attorney, Agent, or Firm* — Reising Ethington P.C.

(57) ABSTRACT

Subject matter of the invention is a fishing line insertion aid for threading a fishing line into rod rings of a fishing rod. Creation a fishing line insertion aid of the type mentioned above by means of which a fishing line can be rapidly and easily threaded into the rod rings of the fishing rod is achieved by a substantially elongated body (110) into which a line notch (112) is embedded for fastening of the fishing line (14) in a clamping manner.

8 Claims, 3 Drawing Sheets

(56) References Cited

U.S. PATENT DOCUMENTS

| | | | | |
|---|---|---|---|---|
| 4,047,397 A | * | 9/1977 | Laliberte | D04B 33/00 66/118 |
| 4,846,351 A | * | 7/1989 | Gardiner | D04B 3/00 206/574 |
| 6,668,597 B2 | * | 12/2003 | Robinson | D04B 3/02 66/118 |
| 8,499,586 B1 | * | 8/2013 | Adam | D04B 33/00 66/118 |
| 2003/0074827 A1 | * | 4/2003 | Maguire | A01K 87/002 43/24 |
| 2006/0272195 A1 | * | 12/2006 | Ekker | A01K 97/00 43/4 |

FOREIGN PATENT DOCUMENTS

| | | |
|---|---|---|
| GB | 2321066 A | 7/1998 |
| JP | H06-133672 A | 5/1994 |
| JP | 3016668 U | 7/1995 |
| JP | 2000-116286 A | 4/2000 |
| JP | 2007-330107 A | 12/2007 |
| JP | 2013-116091 A | 6/2013 |

OTHER PUBLICATIONS

International Search Report issued in International (PCT) Patent Application No. DE/2016/200312 (dated Oct. 28, 2016).
English language translation of International Search Report issued in International (PCT) Patent Application No. DE/2016/200312 (dated Oct. 28, 2016).
Office Action issued in corresponding Japanese Patent Application No. 2018-521461 (dated Jun. 9, 2020).
English (machine) translation of JP H06-133672.
English (machine) translation of JP 3016668 U.
English (machine) translation of JP 2013-116091 A.

* cited by examiner

FISHING LINE THREADING AID FOR THREADING A FISHING LINE INTO THE ROD RINGS OF A FISHING ROD

CROSS-REFERENCE TO RELATED APPLICATION

This application is the national stage application of International Application No. PCT/DE2016/200312, filed Jul. 8, 2016, which designated the United States of America; this application also claims priority, under 35 U.S.C. § 119, to German Patent Application No. DE 10 2015 008 961.7, filed Jul. 15, 2015; the prior applications are herewith incorporated by reference in their entirety.

FIELD OF THE INVENTION

The present invention relates to a fishing line insertion aid for threading a fishing line into the rod rings of a fishing rod according to the preamble of patent claim 1.

BACKGROUND OF THE INVENTION

During fishing with a fishing rod it sometimes happens that a new fishing line must be inserted. During the process the free end of the fishing line must be passed through the rod rings fastened to the rod before this free end can be knotted to further aids. In order to pass the fishing line through the rod rings, a device for threading the fishing line is known from the DE 199 92 199 C2, which comprises a holder and a metal needle, wherein the holder comprises two bearing surfaces spaced apart into which longitudinal grooves are moulded for receiving and guiding the metal needle, and wherein the holder in the area of the bearing surfaces below the longitudinal grooves comprises permanent magnets. Said threading of the fishing line both without the device according to the DE 199 02 199 C2 and with the device according to the DE 199 02 199 C2 into the various rod rings is very cumbersome and requires some skill, in particular since such a fishing rod can also be very long.

Hence, it is the objective of the present invention to create a fishing line threading aid of the type mentioned above by means of which a fishing line can be threaded rapidly and easily into the rod rings of the fishing rod.

SUMMARY OF THE INVENTION

As a technical solution to said objective a fishing line threading aid of the type mentioned above with the features of patent claim 1 is suggested according to the invention. Advantageous further embodiments of said fishing line threading aid can be taken from the dependent claims.

A fishing line threading aid formed according to said technical teaching has the advantage that the fishing line can be clamped into the line notch in a simple manner, if necessary, also only by hand, and that the angler then takes the fishing line insertion aid in order to lead it through the individual rod rings. The threading of the fishing line insertion aid through the rod rings is clearly easier than the respective threading of the still very thin fishing line. After the fishing line has been threaded through all rod rings, the fishing line can then be released in a simple manner from the clamping in the line notch without a great physical effort being necessary for this.

In a preferred further embodiment it has proven to be advantageous to form said line notch in a tapered manner. By this it is possible to clamp fishing lines of different thicknesses into the line notch.

In a preferred embodiment the line notch is oriented in an axial direction. This has the advantage that the fishing line during passing through of the fishing line insertion aid through the rod rings is drawn further into the line notch, and thus an inadvertent slipping out of the fishing line is avoided.

In another preferred embodiment a groove is formed starting from the end of the line notch up to the end of the body for receiving the fishing line. This has the advantage that the fishing line protruding from the line notch can be accommodated in said groove without the total diameter of the fishing line insertion aid increasing as a result which, in turn, has the advantage that the diameter of the fishing line insertion aid can correspond to the diameter of the smallest rod ring which, on the one hand, facilitates the manufacture of the fishing line insertion aid and, on the other hand, improves the grip and manageability of the fishing line insertion aid.

According to another preferred embodiment a lip is formed on the line notch which is flattened at the outside on its free end. After clamping of the fishing line into the line notch, it may happen that the lip protrudes radially outward and thus makes difficult a passing of the fishing line insertion aid through the rod ring. Flattening of the lip clearly reduces this problem.

In still another preferred embodiment the body is formed at least partially lengthwise in a curved manner. This has the advantage that the insertion of the fishing line insertion aid into rod ring and subsequent removal is clearly facilitated as a result because the fishing line insertion aid thus follows the natural movement of the angler during insertion.

In still another preferred embodiment a return stop is provided on the body, wherein the return stop is preferably formed as a slot introduced into the body with the slot opening towards the line notch.

A return stop has the advantage that the angler can interrupt the threading on one of the rod rings by mounting the fishing line insertion aid with the return stop on the corresponding rod ring and thus has time and opportunity to concentrate on other things without the fishing line getting out of the already threaded rod ring.

It has turned out to be advantageous here to have a tongue formed on the slot protrude at least partially radially outward from the body, and to form said tongue, if necessary, in a resilient manner so that the tongue under force can entirely swing into the body.

The alignment of the slot and the associated tongue in axial direction has the further advantage that the tongue during passing of the fishing line insertion aid through the rod ring is pressed against the body of the fishing line insertion aid and thus does not represent an obstacle. Due to the inherent storage capacity of the material, the tongue after leaving the rod ring comes off radially and thus activates the return stop in the event that the angler releases the fishing line insertion aid, and secures the fishing line insertion aid against inadvertent slipping out from the rod ring.

In still another embodiment it has turned out to be advantageous to manufacture the fishing line insertion aid from fluorescent material so that also under poor lighting conditions, for example, in the twilight or at night, the fishing line can be lead through the rod rings by means of the fishing line insertion aid.

BRIEF DESCRIPTION OF THE DRAWINGS

Further advantages of the fishing line insertion aid according to the invention result from the attached drawing and the embodiments described below. Also, the above mentioned features and the features still explained further can be used according to the invention individually in each case or in any combination with each other. The embodiments mentioned are not to be considered as an exhaustive list but are rather of an exemplary nature.

DETAILED DESCRIPTION OF THE PREFERRED EMBODIMENTS

Figure 1:
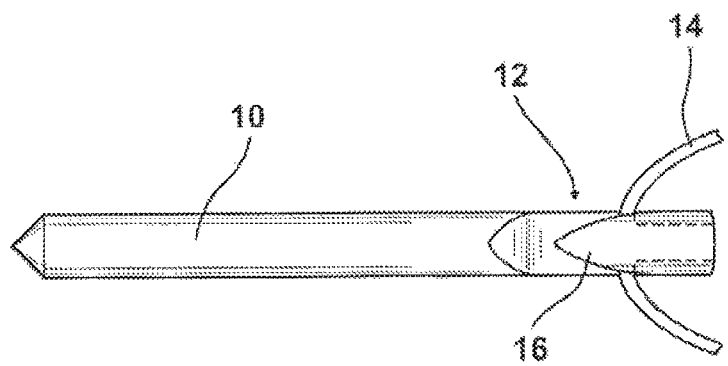
FIG. 1 is a top view of a first embodiment of a fishing line threading aid according to the invention with threaded fishing line.
Figure 2:
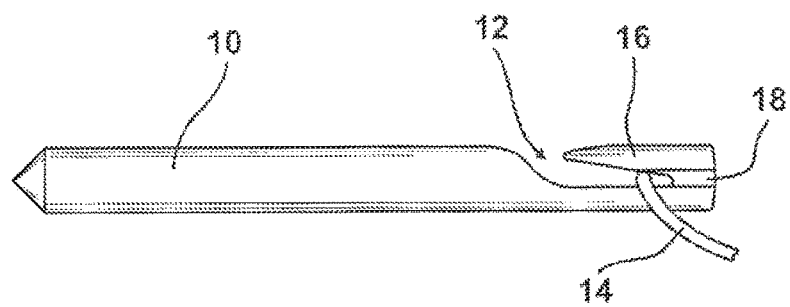
FIG. 2 is a side view of the fishing line threading aid according to FIG. 1.
Figure 3:
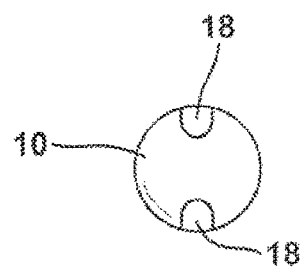
FIG. 3 is a front view of the fishing line threading aid according to FIG. 1.

In FIGS. 1 to 3 a first embodiment of the the fishing line insertion aid according to the invention is shown. It comprises a body 10 and a line notch 12 formed on the body in which a fishing line 14 can be held in a clamping manner. The line notch 12 is oriented in an axial direction of the body 10 and comprises a lip 16 which is formed in a flattened manner at the outside on its free end.

The line notch 12 is formed in a tapered manner in order to be able to receive fishing lines 14 of various thicknesses in a clamping manner. On both sides of the line notch 12 a groove 18 each for receiving the fishing line 14 is formed starting from one end of the line notch 12 up to the end of the body 10.

The insertion aid shown in FIGS. 1 to 3 is formed from a resilient but dimensionally stable plastic material and has a fluorescent colour.

Figure 4:
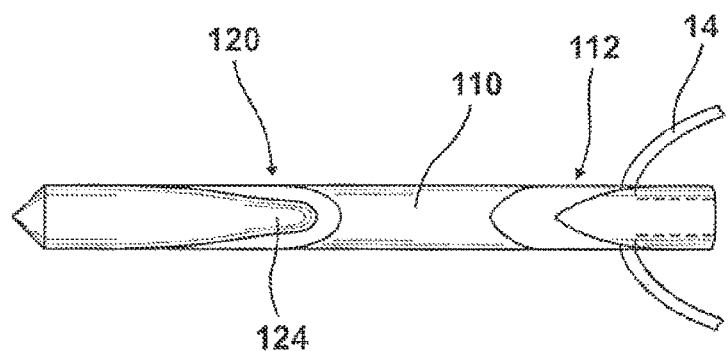
FIG. 4 is a top view of a second embodiment of a fishing line threading aid according to the invention.
Figure 5:
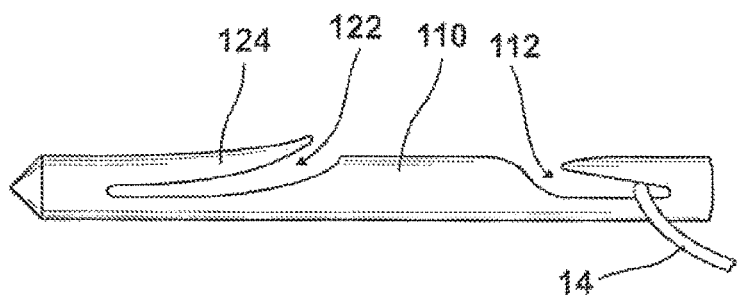
FIG. 5 is a side view of the fishing line threading aid according to FIG. 4.

In FIGS. 4 and 5 a second embodiment of a fishing line insertion aid according to the invention is shown, which is formed identically to the fishing line insertion aid described in FIGS. 1 to 3 but in addition comprises still a return stop 120. This return stop 120 is formed as a slot 122 embedded into the body 110 which is oriented in an axial direction and opens up towards the line notch 112. The return stop 120 comprises also a radially somewhat protruding tongue 124 which is formed in a resilient manner. With said tongue 124 the fishing line insertion aid remains stuck on the fishing rod at such a backward movement and thus prevents the inadvertent sliding back of the fishing line from the already threaded rod ring.

Figure 6:
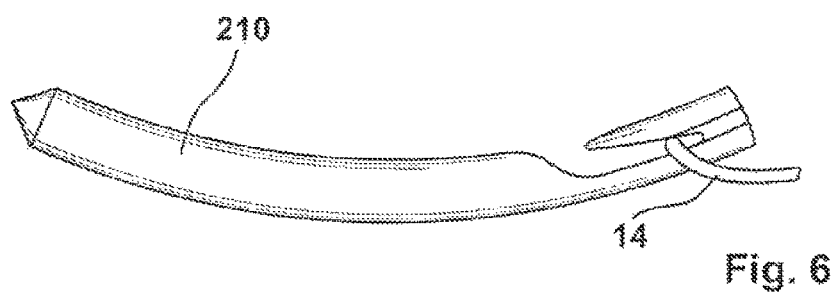
FIG. 6 is a side view of a third embodiment of a fishing line threading aid according to the invention.

In FIG. 6 a third embodiment of the fishing line insertion aid according to the invention is shown which is configured in an analogue manner to the first embodiment shown in FIGS. 1 to 3. The only difference is that here the body 210 is formed in a curved manner along the longitudinal axis. By this, the natural hand movement when leading the fishing line insertion aid through a rod ring is taken into account so that the insertion is facilitated further.

In an embodiment not shown here the fishing line insertion aid is formed in an analogue manner to the second embodiment and moreover is likewise formed in a curved manner along the longitudinal axis.

Figure 7:
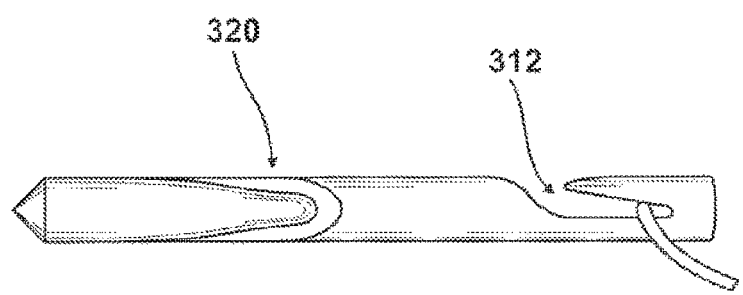
FIG. 7 is a side view of a fourth embodiment of a fishing line threading aid according to the invention.

In FIG. 7 a fourth embodiment is shown, which is formed in an analogue manner to the second embodiment shown in FIGS. 4 and 5, wherein, however, the return stop 320 is arranged rotated by 90° with respect to the line notch 312.

In another embodiment not shown here, the return stop is arranged rotated by 120° or 180° with respect to the line notch.

The fishing line insertion aid described here is used as follows:

At first, the angler takes one end of the fishing line 14 and leads the fishing line 14 close to said end so deep into the tapering line notch 12, 112 until the fishing line 14 is held in a clamping manner there. Subsequently the angler takes the substantially cylindrical body 10, 110, 210 of the fishing line insertion aid and pushes the same through the lowest rod ring, then through the next rod ring etc.

In order that the fishing line insertion aid does not get caught to a rod ring with its line notch 12, 112, the lip 16 of the line notch 12, 112 is formed in a flattened manner on its free end. Said flattening occurs ideally until no part of the lip 16 protrudes radially beyond the body.

When threading the fishing line insertion aid through the rod ring, in particular, when the rod rings are very small, the fishing line 14 is pressed into the grooves 18 provided on the right and left of the body so that the fishing line 14 does not form a thickening of the body 10, 110, 210. This has the advantage that the fishing line insertion aid can also be lead through the smallest rod rings without it being necessary that a thinner fishing line insertion aid must be used.

In the event that the fishing line insertion aid comprises a return stop 120, the threading can be easily interrupted by the angler by the fact that the fishing line insertion aid after partial pushing through a rod ring is pulled back again to some extent. The tongue 124 of the return stop 120 during passing through the rod ring due to its elasticity is pressed to the body 110 so that no increase of the cross-section of the body 110 occurs here. After the return stop 120 has passed through the rod ring, the tongue 124 due to the material properties jumps radially outward so that the fishing line insertion aid after a short backward movement can be mounted with its slot 122 on the rod ring, and the fishing line 14 in this position holds on the fishing rod. Now the angler can turn to other activities without that the fishing line gets out of the already threaded rod rings again.

Due to the fluorescent configuration of the fishing line insertion aid, it can also be well used under poor lighting conditions, for example, in the twilight or at night.

LIST OF REFERENCE NUMERALS:

| | |
|---|---|
| 10, 110, 210 | body |
| 12, 112, 312 | line notch |
| 14 | fishing line |
| 16 | lip |
| 18 | groove |
| 120, 320 | return stop |
| 122 | slot |
| 124 | tongue |

The invention claimed is:

1. A fishing line insertion aid for threading a fishing line (14) into the rod rings of a fishing rod, comprising:
   a substantially elongated body (10, 110) extending along a longitudinal axis, a first portion of the body (10, 110) having a substantially uniform outer diameter configured for insertion through the rod rings of the fishing rod; and, a line notch (12, 112, 312) for fastening of the fishing line (14) formed in the first portion of the body (10, 110), the line notch (12, 112, 312) having a first portion extending in a direction parallel to the longitudinal axis and defining a closed end and a second portion extending radially relative to the longitudinal axis and the first portion of the line notch (12, 112, 312) and defining an open end at the outer diameter of the body (10, 110), the first portion of the line notch (12, 112, 132) defined by a flat surface parallel to the longitudinal axis and an inclined surface opposing the flat surface such that the first portion of the line notch (12, 112, 132) tapers to trap the fishing line between the flat surface and the inclined surface in a clamping manner, and;

a return stop (120, 230) formed on the body (110), wherein the return stop (120, 320) comprises a slot (122) embedded into the body (110) which is oriented in an axial direction and which opens toward the line notch (112, 312) and a tongue (124) formed on the slot (122) at least partially protruding radially from the body (110) beyond the outer diameter of the first portion of the body (10, 110).

2. The fishing line insertion aid according to claim 1, further comprising at least one groove (18) formed in the body (10, 110) having a first end in communication with the closed end of the line notch (12, 112, 312) and a second end terminating at the end of the body (10, 110), the at least one groove (18) formed for receiving the fishing line (14).

3. The fishing line insertion aid according to claim 2 wherein the at least one groove (18) extends in a direction parallel to the longitudinal axis.

4. The fishing line insertion aid according to claim 2 wherein the at least one groove (18) includes first and second grooves (18).

5. The fishing line insertion aid according to claim 4 wherein the first and second grooves (18) extend in a direction parallel to the longitudinal axis.

6. The fishing line insertion aid according to claim 1, that wherein a lip (16) formed on the line notch (12, 112, 312) in a flattened manner at the outside on its free end such that the lip (16) is within the outer diameter of the first portion of body (10, 110).

7. The fishing line insertion aid according to claim 1, wherein the body is formed at least partially in a curved manner.

8. The fishing line insertion aid according to claim 1, wherein the tongue (124) is configured resiliently in such a manner that the tongue (124) under force can entirely swing into the body (110).

\* \* \* \* \*